United States Patent
Parker et al.

(10) Patent No.: US 9,658,885 B2
(45) Date of Patent: May 23, 2017

(54) ASYNCHRONOUS TASK MULTIPLEXING AND CHAINING

(71) Applicant: Home Box Office, Inc., New York, NY (US)

(72) Inventors: J. Jordan C. Parker, Seattle, WA (US); Tyler R. Furtwangler, Sammamish, WA (US); Brandon C. Furtwangler, Issaquah, WA (US); Nathan J. E. Furtwangler, Kirkland, WA (US); Patrick Finnigan, Seattle, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

(21) Appl. No.: 14/843,870

(22) Filed: Sep. 2, 2015

(65) Prior Publication Data

US 2016/0070595 A1    Mar. 10, 2016

Related U.S. Application Data

(60) Provisional application No. 62/046,116, filed on Sep. 4, 2014.

(51) Int. Cl.
  *G06F 9/46* (2006.01)
  *G06F 9/48* (2006.01)
  *G06F 9/54* (2006.01)

(52) U.S. Cl.
  CPC .............. *G06F 9/4881* (2013.01); *G06F 9/54* (2013.01); *G06F 9/542* (2013.01); *G05B 2219/25367* (2013.01)

(58) Field of Classification Search
  None
  See application file for complete search history.

(56) References Cited

U.S. PATENT DOCUMENTS

| | | | |
|---|---|---|---|
| 8,108,878 B1 | 1/2012 | Pulsipher | |
| 2004/0025163 A1* | 2/2004 | Babutzka | G06F 9/5038 718/106 |

(Continued)

FOREIGN PATENT DOCUMENTS

EP    1024429    8/2000

OTHER PUBLICATIONS

International Search Report and Written opinion from International Patent Application Serial No. PCT/US2015/048403, Dated Dec. 4, 2015, 13 pages.

(Continued)

*Primary Examiner* — Sisley Kim
(74) *Attorney, Agent, or Firm* — Amin, Turocy & Watson, LLP

(57) ABSTRACT

The described technology is directed towards sharing asynchronous (async) tasks between task chains, including in a way that prevents cancellation of lower-level chain entity from cancelling a shared async task. A shared async task is wrapped in multiplexer code that maintains lower-level entity identities as a set of listeners of the shared async task, and when a listener cancels, only removes that listener from the set of listeners so that the shared async task does not cancel as long as one listener remains in the set. Also described is optimization to share an async task, and wrapping tasks in cancel-checking code that prevents the task from running its work if the task is intended to be cancelled but is queued to run before the cancel request is queued to run.

20 Claims, 13 Drawing Sheets

(56) References Cited

U.S. PATENT DOCUMENTS

| | | |
|---|---|---|
| 2010/0318995 A1 | 12/2010 | Messmer et al. |
| 2011/0202924 A1 | 8/2011 | Banguero et al. |
| 2011/0239217 A1 | 9/2011 | Toub et al. |
| 2011/0321051 A1 | 12/2011 | Rastogi |
| 2012/0102501 A1* | 4/2012 | Waddington .......... G06F 9/5061 718/105 |
| 2012/0110581 A1 | 5/2012 | Watson et al. |

OTHER PUBLICATIONS

Aiftimiei, C; et al; "Design and implementation of the gLite CREAM job management service," Future Generations Computer Systems, Elsevier Science Publishers. Amsterdam, NL, vol. 26 No. 4, Apr. 1, 2010, 14 pages.

Dokulil, Jiri; et al; "Improving Blocking Operation Support in Intel TBB," 2013 International Conference on Parallel and Distributed Computing, Applications and Technologies, IEEE, Dec. 16, 2013, 6 pages.

\* cited by examiner

ASYNCHRONOUS TASK MULTIPLEXING AND CHAINING

CROSS-REFERENCE TO RELATED APPLICATION

The present application claims priority to U.S. provisional patent application Ser. No. 62/046,116, filed Sep. 4, 2014, the entirety of which is incorporated herein by reference.

BACKGROUND

In running a computer program, a piece of computing work may take an indefinite amount of time to complete. For example, completion of a network request depends on various factors, including latency, available bandwidth, whether the network communication link is down, whether the server is down or operating slowly, and so on.

In a synchronous programming model, if a call to something is made that takes awhile, the program code blocks and waits for the call to complete (although the program code eventually may time out if too much time transpires). Waiting for completion is generally undesirable because other parts of the program code may be able to perform useful work while waiting for the slow task to complete.

One way to solve this problem is using multiple threads of execution. However, multiple threads of execution are not always available; e.g., certain programming environments are single threaded. Further, using multiple threads of execution is not always efficient in some scenarios, e.g. because thread switching consumes resources.

Another way to solve the waiting problem is to make the call and get the result back asynchronously, at a later time when the work is complete. There are many different variations of this basic asynchronous idea (e.g., Futures, Promises, Tasks, Channels . . . , referred to herein as "async tasks" or "async work"). Among the benefits of asynchronous calling include that it is thread agnostic. However, there are also potential complications with running async tasks that need to be considered so as to provide robust program code.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards multiplexing an async task that is identified in at least two task chains, including sharing results of the async task between a set of listeners comprising at least two dependent lower-level listeners. The technology includes maintaining identity information of each dependent lower-level listener in association with the async task, and preventing the cancellation of one listener from cancelling the async task as long as at least one listener remains dependent on the async task, based upon the identity information.

Also described herein is wrapping tasks in cancel-checking code that prevents a task from performing its work if the task is intended to be cancelled, but is queued to run before the cancel request is queued to run.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

The technology described herein is directed towards chaining and optimizing asynchronous "async" tasks or work, while protecting against problems that result from cancelling an async task. As will be understood, this includes optimizing redundant tasks into shared tasks, using one or more shared async task multiplexers that manage cancellation, and protecting against running an async task that is intended to be cancelled.

In one aspect, as part of optimizing chains of async tasks, an async task that is dependent upon by more than one chain may be shared by subsequent listeners, comprising other entities (e.g., other async tasks) that are dependent on the shared async task. In general and as will be understood, if a listener is cancelled, instead of also cancelling the shared async task, multiplexing of the shared async task prevents cancelling of the shared, multiplexed async task, (unless and until there are no other listeners). This is because other listeners also may be dependent on the shared async task.

Further, in general and as will be understood, described herein is a way to prevent a "to-be-cancelled" task from being run. A task that is to be cancelled may be queued for running before the cancellation task (that is, the task that cancels that to-be-cancelled task) is queued, in which event the to-be-cancelled task runs before the cancellation task can cancel it, which may be problematic. To deal with this situation, a task is wrapped with code that checks for its cancellation before performing its operations; even if queued before the cancelling task, the task when dequeued and run will not perform any other operations beyond the wrapped cancellation check if the task has been cancelled.

It should be understood that any of the examples herein are non-limiting. For instance, while single-threaded application programs such as written in JavaScript® may benefit from the technology described herein, and indeed JavaScript® promises are used in some examples, any suitable programming language may be used, including those where multi-threading is available but, for example, deemed less desirable at least in part by a developer. As another example, exemplified herein is a general computing environment, however it is understood that any machine/device capable of executing asynchronous tasks may benefit from the technology described herein, including gaming and entertainment consoles, personal (e.g., laptop and desktop) computers or workstations, servers, handheld devices, smartphones, tablet computing devices and the like. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in asynchronous computing technology in general.

Figure 1:
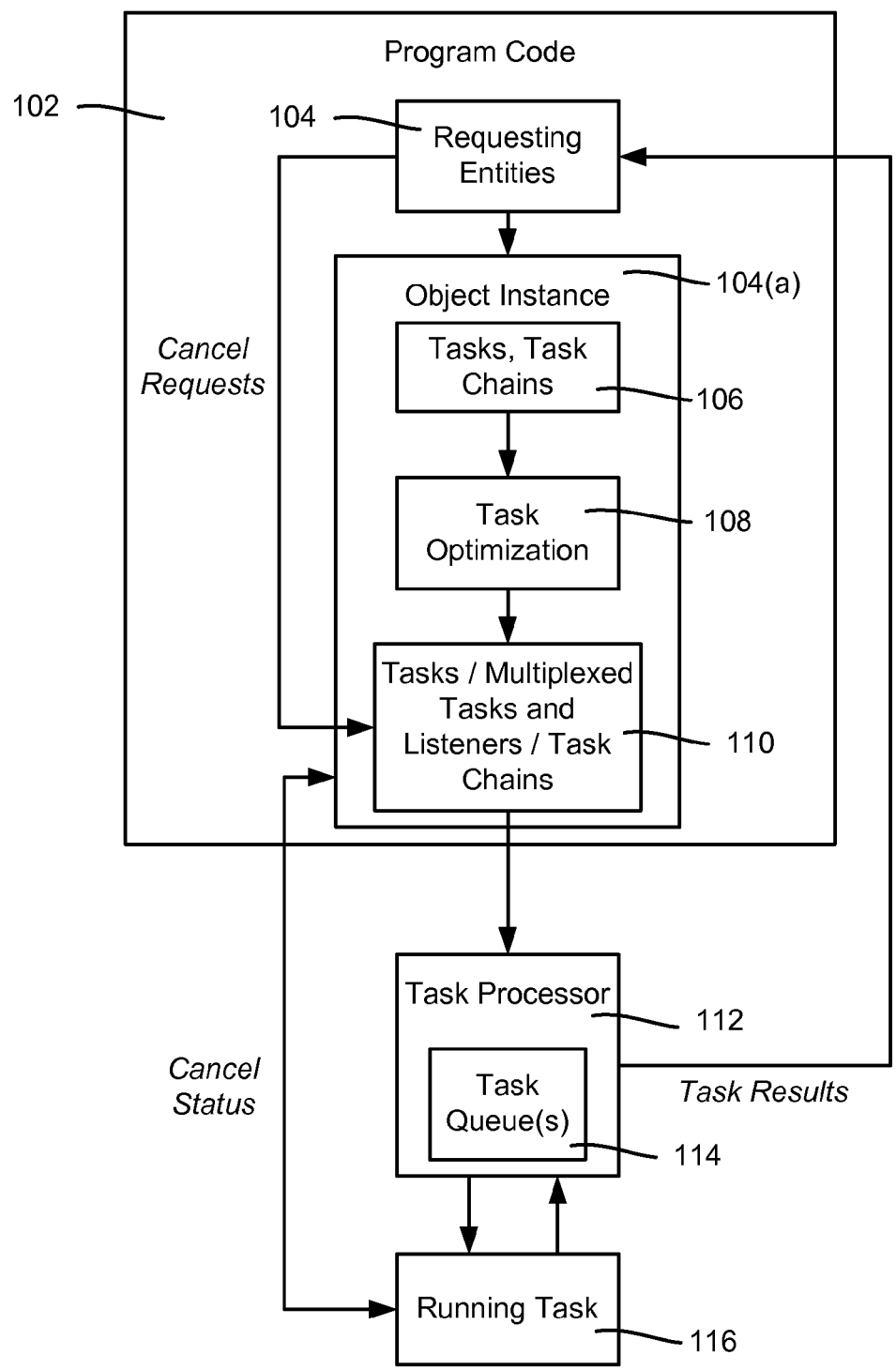
FIG. 1 is a block diagram showing an example configuration of components that may be used to share asynchronous (async) tasks, including multiplexing the shared async task to manage listener cancellations, according to one or more example implementations.

FIG. 1 is a block diagram showing example components directed towards asynchronous task multiplexing and chaining. In general, program code 102 includes a number of requesting entities 104, such as processes, objects and the like. For example, a requesting entity 104(a) is shown (e.g., an object instance) that has a number of asynchronous tasks 106 that need to be run.

In general, tasks are arranged by the requesting entities to be relatively small and fast to operate. For example, consider a part of program code in which a string needs to be fetched and parsed to look for a condition, after which some action is taken based upon the condition being met or not met as a result of the parsing. Such acts may take a long time or undetermined amount of time to complete, and thus the program code may divide the logic into a chain of smaller tasks, (also referred to as work items), e.g., a task to request the string, followed by a dependent task to parse the string after the fetch request completes, followed by a dependent task to determine the action to take after the parsing completes, followed by a dependent task that takes the action. Further, the parsing task may be divided, e.g., only some maximum number of characters can be parsed at a time. In this way, possibly slow program code can be handled by a number of chained asynchronous tasks, allowing other asynchronous tasks to be handled (by similarly queuing those other tasks as they come in) without having to wait for some larger portion of slow program code to fully complete. Moreover, having small tasks allows returning to the program code on a generally regular basis, e.g., for a portion of each rendering frame so that the program does not appear to freeze to the user.

In general, a set of tasks (up to any practical number) may be chained, e.g., tasks [A, B, C, . . . ] may be chained together such that task A runs, task B runs if task A completes successfully, and then task C runs if task B completes successfully, and so on. Moreover, as described herein, task optimization 108 may be performed to avoid unnecessarily duplicating tasks that are needed by more than one chain. For example, an async task X may be run once to provide a result that is needed by some other entity Y and some other entity Z. To this end, optimization 108 may combine a request that asks for task X then Y, and task X then Z, so that the async task X runs once, with its result shared by both Y and Z, referred to herein as "listeners" relative to the shared async task X.

As can be readily appreciated, optimization may be performed dynamically at the entity level, e.g., an object may be coded to recognize the ability to share task X once the object determines the task chains it needs to run. Alternatively, (or in addition to dynamic optimization), at least some task chains may be optimized before runtime, e.g., an object may have its tasks optimized for sharing at program loading time (or compilation time), such that when the tasks are to be performed during runtime, the chains are already optimized. Still further, it is feasible to have a programming language statement that allows the developer to directly specify sharing, e.g., share(X).listeners(Y, Z).

Moreover, a task that is shared may be multiplexed as described herein. In general, multiplexing refers to protecting a shared task from being cancelled by one listener when there is another independent listener that still depends on that shared task.

As represented in FIG. 1 by block 110, there are thus tasks, multiplexed (shared) tasks and their listeners, and chained tasks that may be present for doing a program code's asynchronous work. A multiplexed task is followed by listeners, and a listener may be part of a chain of tasks. A multiplexed task may be a listener of a prior task or a prior shared (multiplexed) task.

During runtime, the program code 102 (e.g., the object instance 104(a) therein) calls a function or the like of an async task processor 112 that queues each task in one or more suitable internal or external queues 114 (there may be different priority queues, for example). In general, a dependent chained task is not requested to be queued until the task on which it depends completes successfully. The async task processor 112 dequeues and runs (block 116) the queued tasks, e.g., based upon their queue ordering (including factoring in any queue priority considerations).

One suitable async task processor comprises an asynchronous dispatcher, such as described in U.S. patent application Ser. No. 14/803,842, hereby incorporated by reference. Such an async task processor 112 and its queues 114 may be hosted in the program code 102, hosted in a browser or other suitable program coupled to the program code 102, hosted within a browser or other suitable program that is hosted in the program code 102, or otherwise executed in any other suitable way, e.g., as an independent entity.

In general, an async task can complete with success or failure, as represented in FIG. 1 by the "Task Results" arrow returning to the requesting entities 104. Further, if the program code wants to stop an async task before it completes, the program code can cancel the async task. Note however that cancelling a task is based upon queuing a cancel task, (which as described herein can lead to problems if a task to be cancelled has already been queued before the cancel task is queued).

To summarize, the program code 102 can have one async task depend on another to create "chains" or "trees" of them, e.g., a task B may need task A to complete successfully so that task B can use task A's result. Promises (e.g., in JavaScript®) are one way to establish this dependency link via the then( ) method, for example, A.then(B). A larger chain may be established, e.g., A.then(B).then(C).then(D), and so on. Moreover, via optimization a single async task can have more than just one async task depending on it. For example, async task A may retrieve some data from the network that task B needs, as does a separate task chain that includes X; A.then(B) and A.then(X) may be two separate JavaScript® promises, whereby via optimization both may be made dependent on task A. Example optimization-related details are described below with reference to FIGS. 10-12.

Turning to multiplexing aspects, in contemporary programming, cancelling an async task that is part of a task chain bubbles up and down the task chain. For example, if task B of a task chain A→B→C is cancelled, then task C is cancels, as does task A. This may cause a number of problems.

By way of example of one problematic issue, consider that there is a piece of async work A from which multiple entities (such as processes or other async work items) want the result, e.g., A→B→C and A→X. Each entity may issue the work item A separately, but that is typically inefficient. As a typical example, consider that async work item A retrieves a large amount of data from the network, which is subsequently processed by various entities; it is inefficient to run A to retrieve the same data for each entity. Instead, it is typically more efficient if a first entity starts the work A, and the other entities B and X listen for the result.

For example with Promises, Promise A does the work and then each listener does A.then( . . . ) to get its own Promise dependent on task A's result. This works well if task A completes, however cancellation beforehand presents a problem. More particularly, if any of the listeners such as task X decides to cancel, in contemporary environments the cancel cascades and cancels the original task A. Not only does task A get cancelled, but all of the other listeners (task B and task C in this example) are also cancelled, because they depend on A, which because cancelled will never resolve successfully. However, although task B and task C are independent listeners relative to task X, and may have no knowledge of the cancelled entity X (as they were tied together only by optimization), in conventional systems that bubble cancellations up and down a chain, task B and task C are impacted by the cancelling of task X, which is problematic.

Figure 2:
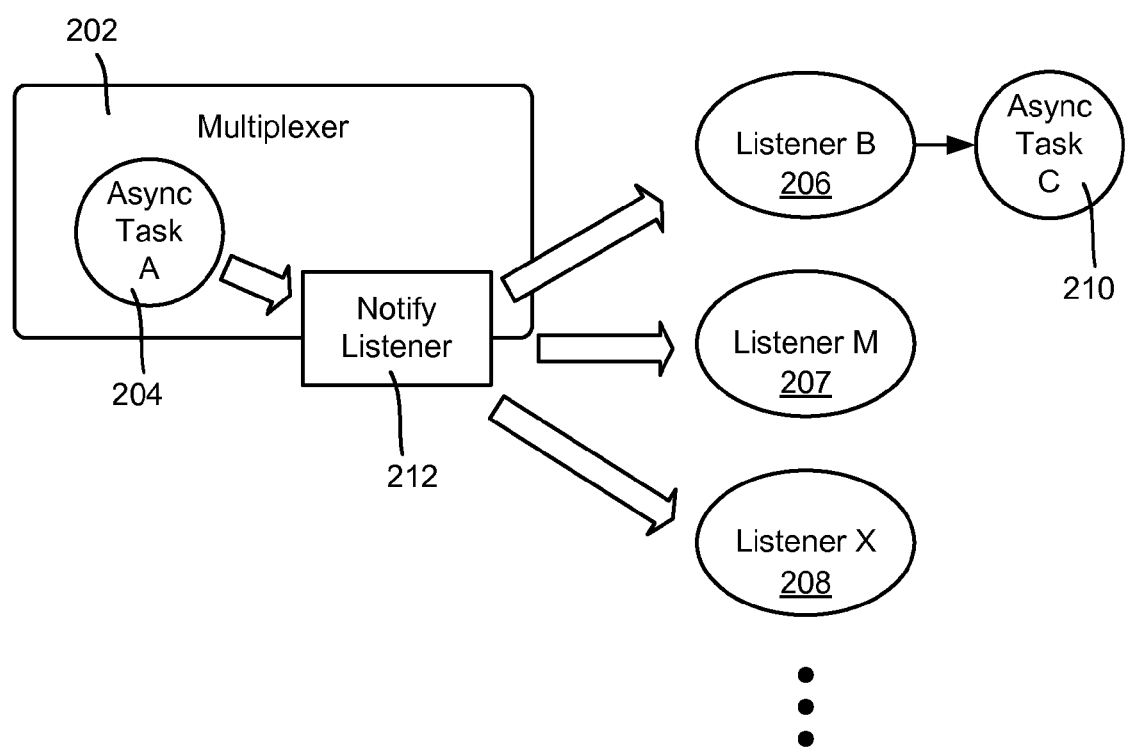
FIG. 2 is a representation of how a shared async task may be multiplexed to notify its non-cancelled listeners upon task completion, according to one or more example implementations.

To overcome this problem, described herein is a multiplexer 202 (FIG. 2) that wraps a piece of shared async work (async task A 204), and while the async task A 204 is pending, may hand out new dependent tasks to the listeners (requestors, at least three of which are exemplified, labeled 206-208) that depend on the original async task A 204, while preventing any cancellation from reaching the original async task A 204. Only if each of the listeners independently cancel does the multiplexer 202 cancel the underlying, shared async task A 204 (unless A is directly cancelled). In this way, the shared async task A 204 is able to run and complete, whereby all the (non-cancelled) tasks are notified (block 210); e.g., each resolve with the success (or failure) value, and can access any accompanying data (e.g., a computation result saved by async task A 204).

Thus, as is understood, if for example the listener B 206 cancels before the async task A 204 completes, the cancel bubbles up from the listener B 206 towards the shared async task 204, (as well as bubbles down to cancel async task C 210). However, because the multiplexer 202 wraps the async task 204 and knows of its other listeners M 207 and X 208, each of which are independent from the listener B 206 and from each other, the multiplexer 202 intercepts the cancel request and knows that only the listener B 206 was cancelled. The listener B 206 is thus removed from the multiplexer's list of listeners to notify, however the listener M 207 and the listener X 208 still are listed as interested in the result of the async task A 204. Note that the "list" may comprise any suitable data structure that tracks the identity information of the listeners, and/or that "removing" the cancelled listener need not be an actual deletion-type removal, but instead, for example, may flag the identity information for the listener as having been cancelled, or perform some similar action. Because the shared async task A's cancellation is stopped by the multiplexer 202, the shared async task A 204 is allowed to be queued, run and complete, and the listener M 207 and the listener X 208 are still appropriately notified when the shared async task A 204 completes.

The async task A 204 may be cancelled in other ways, including directly; for example, the object or the like that requested the async task A 204 may cancel it, such as if the process is an object instance that is being deleted and needs to cancel its tasks, or if the object wants to re-run a new async task A 204. Another way in that a shared async task may be cancelled is by a higher async task that bubbles its cancellation down to the lower shared async task, e.g., if shared async task A was dependent on some async task A0, and async task A0 cancels, then so does the async task A because async task A cannot complete successfully. Also, yet another way to cancel the async task 204 is as mentioned above, namely when there are no longer any listeners that depend on the async task 204. For example if each of the listeners 206-208 independently cancelled, then when there are no more listeners, the last cancel is basically allowed to bubble up to cancel the async task A 204.

Figure 3:
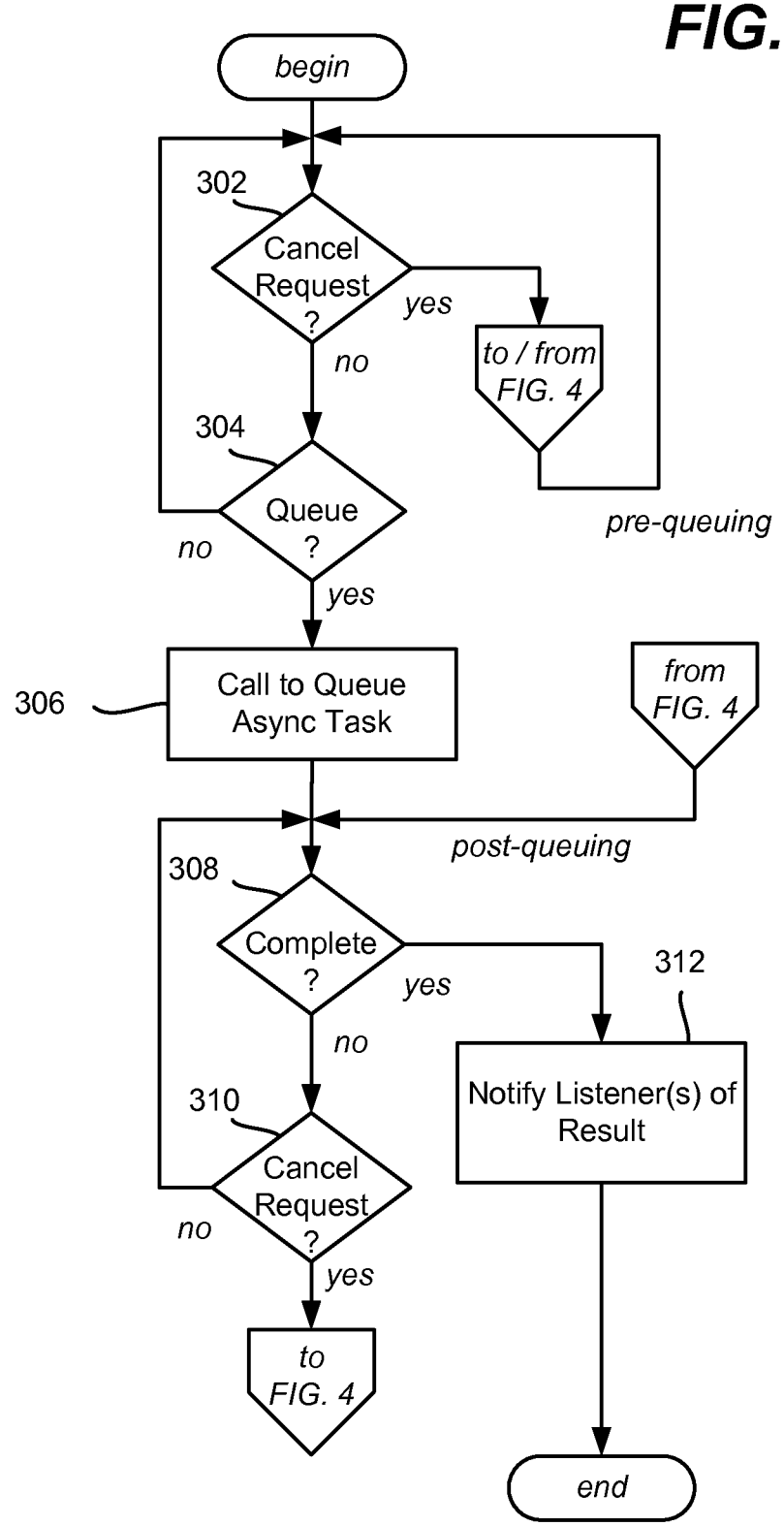
FIG. 3 is a flow diagram showing example steps that may be taken to queue an async task for running until completion or cancellation, according to one or more example implementations.

FIG. 3 is a flow diagram showing some example logic of a multiplexer. Steps 302 and 304 take place before the shared async task that is wrapped as a multiplexer is queued. Step 302 represents checking for a cancel request, which if received is handled by the example steps of FIG. 4, described below. Step 304 represents checking for when the shared async task is to be queued, which if met, branches to step 306 to make the call to queue the shared async task for running, e.g., calls the task processor 112 to queue the task for running when the task processor 112 is able to run it. As is understood, although a loop from step 304 back to step 302 is shown for purposes of illustration, the program code does not block waiting for the cancel or queue.

Once queued, steps 306 and 308 represent a loop "waiting" for the shared, multiplexed async task to complete or be cancelled, respectively, although as is understood, the waiting does not block, such that other work may be performed by the program code during the pending state of the shared, multiplexed async task. If the shared, multiplexed async task completes as evaluated at step 306, the multiplexer notifies the listener(s) of the result at step 310. If instead there is a cancel request at step 308 with respect to the shared, multiplexed async task, the multiplexer handles the cancel request, e.g., using the example logic of FIG. 4.

Figure 4:
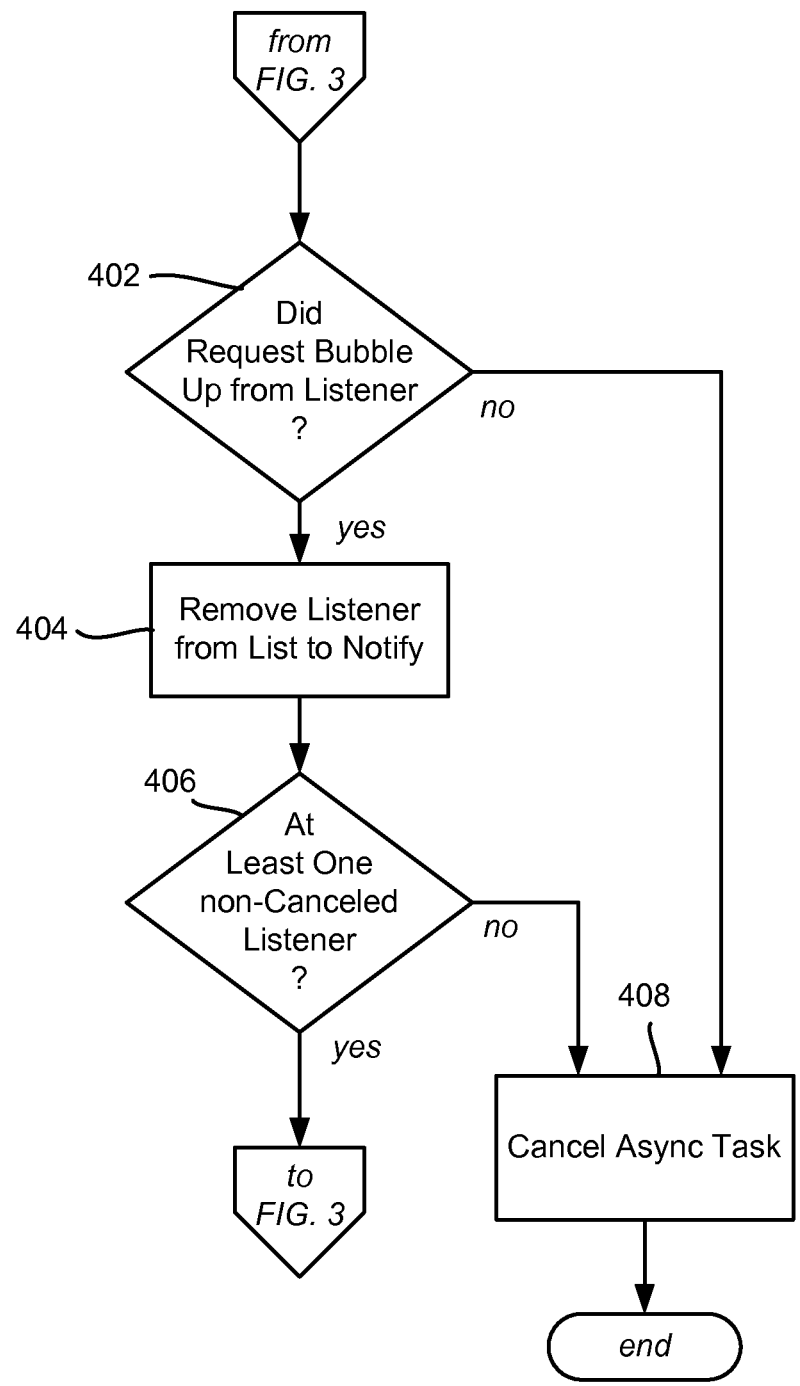
FIG. 4 is a flow diagram showing example steps that may be taken to manage cancellation requests directed to a shared async task, according to one or more example implementations.

In FIG. 4, step 402 evaluates whether the cancel request is one that has bubbled up from a listener. If not, the cancel request is direct, e.g., from the object instance to which the shared, multiplexed async task and any listeners/chains belong, or from a higher up task (e.g., if the multiplexed async task is a dependent listener or otherwise dependent task of another task that was cancelled), and thus the shared, multiplexed async task is cancelled at step 408. Note that this cancellation also cancels the async task's lower listeners, which may in turn cancel their lower listeners and/or dependent tasks. Further, the cancellation of the multiplexed async task may bubble up to a "higher" async task, e.g., if the shared, multiplexed async task was a listener/task in a dependency chain, however the higher" async task, if a multiplexer, may not cancel but instead remove the cancelled async task from its list of listeners.

If the cancel request is one that has bubbled up from a listener, step 404 removes that listener from the list of those to be notified. Any acknowledgement or the like needed by the cancelled listener also may be returned at this time.

Step 406 represents evaluating whether there is at least one remaining independent listener. If not, then the shared, multiplexed async task is cancelled at step 408, (which as described above also may bubble up the cancel). If at least one remains, the shared async task is not cancelled, and the process returns to FIG. 3. If the cancel request was received "pre-queuing," before the shared task was queued, the process of FIG. 4 returns to step 302 until the shared, multiplexed async task is queued or another cancel request is received. If the cancel request was received "post-queuing," after the shared task was queued, the process of FIG. 4 returns to step 308 until the shared, multiplexed async task completes or another cancel request is received.

It is feasible to have a situation in which a task is shared by listeners, but also still desired to run regardless of whether it has listeners, e.g., the code want to run task J, also J.then(K) and J.then(L). This may be optimized to run shared task J with listeners K and L. If K and L cancel, however, then what was shared task J will not run on its own; to avoid this, the optimizer may recognize this situation and, for example, can flag J in some way so that the multiplexer does not cancel shared task J based upon all of its listener(s) cancelling, such as to add a NULL listener or the like that cannot cancel unless J is cancelled directly, e.g., run shared task J with listeners K, L and NULL.

As is understood, multiplexing as described herein is highly useful, including because multiplexing allows abstracting away the fact that different listeners may be sharing the same async work. The listeners are not aware that the multiplexer optimization is happening, and moreover, listeners cannot impact each other.

Turning to another aspect, namely automatic async task cleanup, consider that there is a piece of code that kicks off a chain of async tasks. Every time that code is run, the code makes the same async chain. Each time the async chain is called, it is desirable to first cancel the original async chain (if pending, that is, having at least one not completed task), so that more work than needed is not being done, and so that the result of the old async chain is not accidentally taken.

As another example, if the code that runs a chain has some concept of lifetime associated with the code, when the code is no longer needed it needs to cancel any of its outstanding chains as well. For example, when deleting an instance of an object, the instance's pending chains also need cancellation, at least to avoid unnecessarily consuming resources by doing unneeded work.

A problem with cancelling async work is that the act of cancelling is also asynchronous, (as is generally everything else with these tasks). In other words, a cancel request is also a task that is queued for running when the task processor 112 gets to that cancel task. It is often the situation that before the cancel request task is dequeued and processed, part of the async task chain resolved successfully and is about to run more of the chain, which may trigger other work and/or cause other problems.

By way of example, consider that there is an async dependency chain such as A→B→C→D. Consider further that the chain has just finished task B successfully, and thus queued task C when cancel gets called for the chain. Because task C was queued first, task C is dequeued and run, even though it was requested to be cancelled and is no longer desired to run. Although the cancel request task will be processed after task C, and thus prevent task D from happening, it is still desired to stop task C. For example, recall that a chain may be cancelled to start a new version of it, whereby if the new task A is running in conjunction with the old task C, for example, then unpredictable (and likely sometimes bad) things may happen, whereby such program code is not robust.

Figure 5:
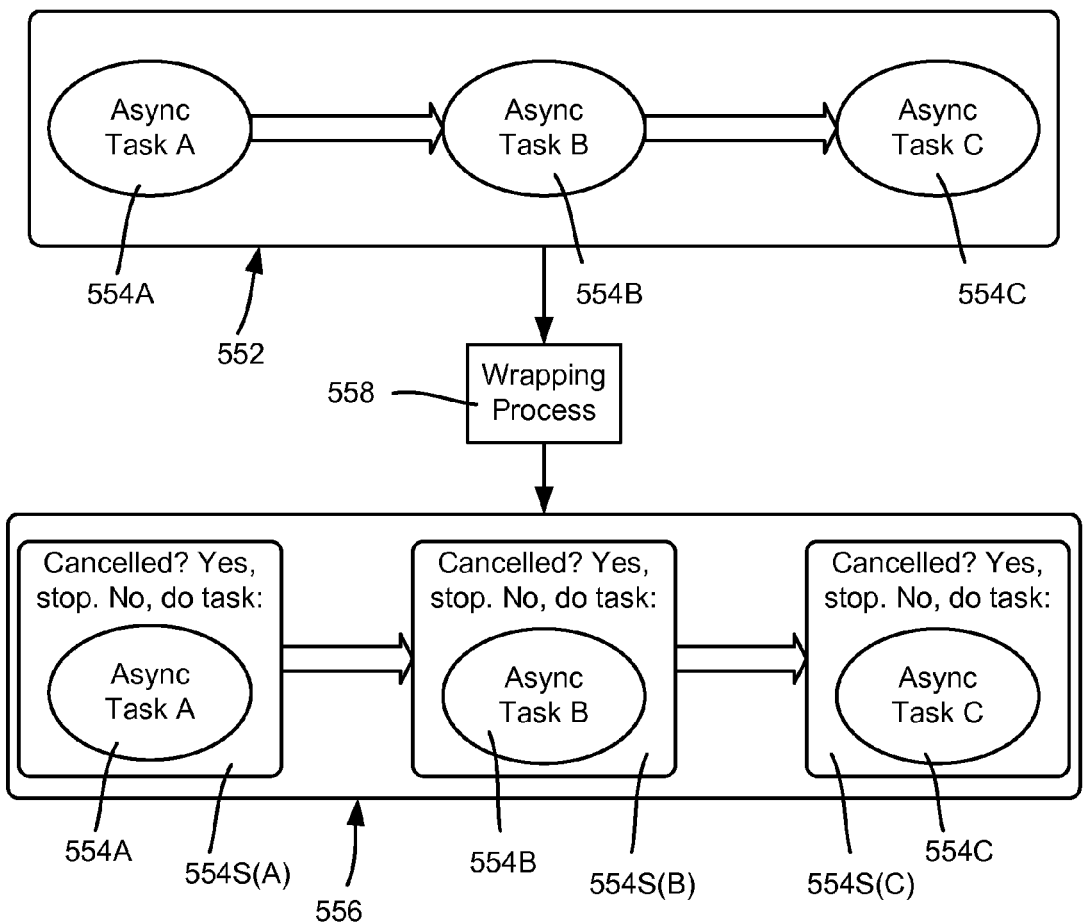
FIG. 5 is a block diagram showing a wrapping process that wraps async tasks in cancel-checking code to prevent unintended running of a cancelled async task, according to one or more example implementations.

The technology described herein and represented in FIG. 5 wraps the tasks in code that first checks to see if cancel was called for that task/its chain. To this end, given an ordered array 552 of async tasks [A, B, C, . . . ] (labeled 554A-554C in FIG. 5) that are not yet linked up, a chain 556 S(A)→S(B)→S(C) . . . (labeled 554S(A)-554S(C) in FIG. 5) is created by a wrapping process 558, where S comprises the code that checks for cancel before running its task.

Thus, regardless of whether a task is queued before the cancel request that is queued to cancel it, when dequeued and run the added wrapped cancel-checking code checks with the program code to see if it is intended to be cancelled. This is generally represented in FIG. 1 by the running task 116 checking back with the program code 102 (requesting entity 104(a)) to check its cancelled or not state; (this information may be stored in any of several possible locations, as long as the task knows where to look for it). If in the cancelled state, the task basically cancels itself by not doing any of its task work, thereby avoiding potential problems with a new task chain. Such a self-cancelled task may complete with a failure status, although another status may be returned to indicate that its completion was not successful because of this self-cancelled condition, for example. Note that the cancel-checking code need not entirely bypass the task code, for example, as it may instead jump to the part of the task code that returns the failure (or other) status.

Figure 6A:
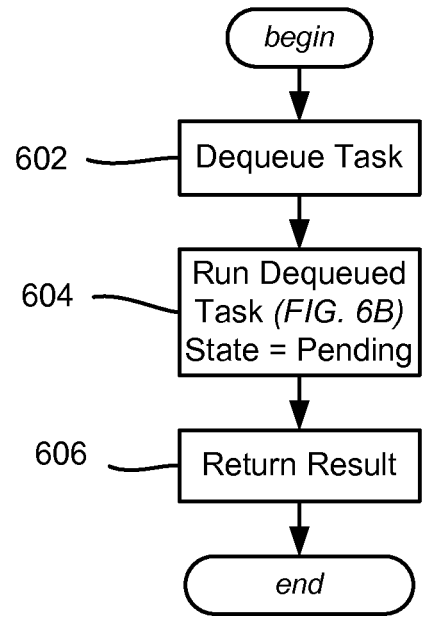
FIGS. 6A and 6B are flow diagrams showing example steps directed towards running an async task (FIG. 6A) wrapped with cancel-checking code, including checking for cancellation (FIG. 6B), according to one or more example implementations.

FIG. 6A exemplifies general task processing, beginning at step 602 where a task is dequeued. Step 604 runs the task, (the task logic is shown in FIG. 6B), and step 606 returns the result.

Figure 6B:
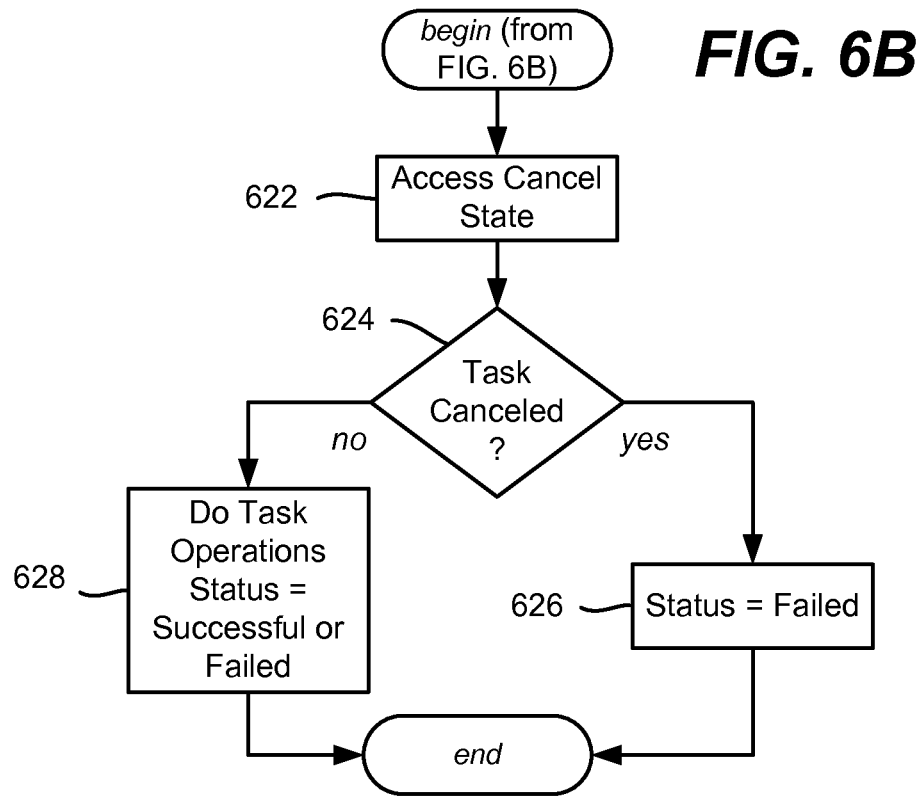

In FIG. 6B, via steps 622 and 624, the task first checks whether it has been cancelled, e.g., step 622 communicates with its requesting entity or checks an agreed upon location for such state data. If cancelled, step 624 branches to step 626, where the status is set to failure (or some other value) that indicates the task did not complete successfully. Otherwise, the task performs its operations, and returns whatever actual status resulted.

To handle the automatic cancelling scenarios described herein, a chain may be stored on the object instance or the like that runs the chain. Each chain is given a unique name by its instance, e.g., "foo." Thus, if trying to run a new "foo" while an old "foo" is still running, the old "foo" is cancelled.

If the instance is being disposed of and it is time to clean up, then each of the instance's pending chains are cancelled.

Figure 7:
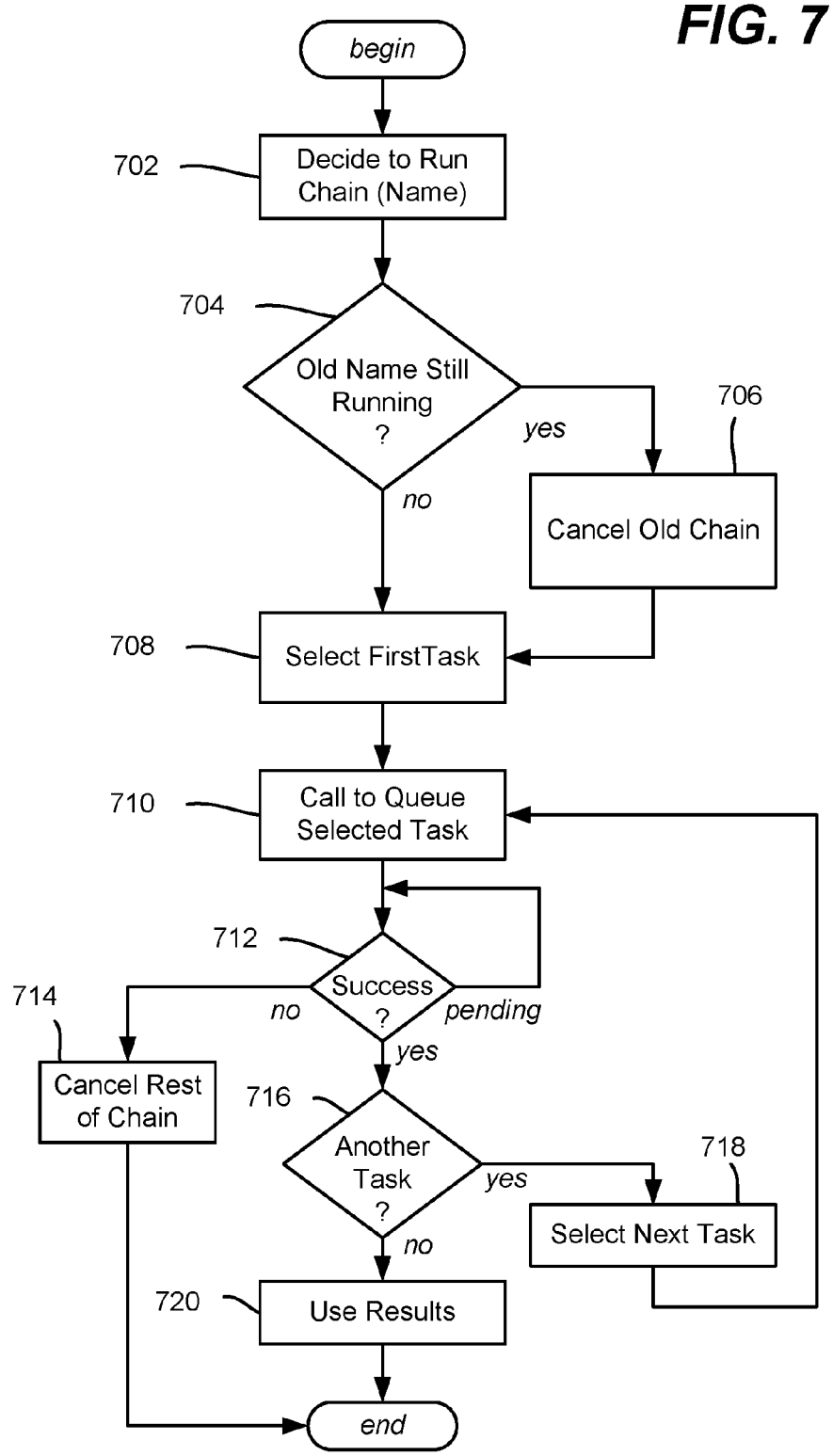
FIG. 7 is a flow diagram showing example steps that may be taken with respect to running a task chain, according to one or more example implementations.

FIG. 7 is a flow diagram containing example steps related to running a chain. Step 702 represents an object deciding to run a certain (named) chain of tasks, which, for example, may be based upon any number of triggers, e.g., user interaction, a timer, a condition being met, a decision being made based upon some data, and so on. Multiple task chains may be run at the same time, and the task chains may be part of an optimized set of chains that share at least one task; however for purposes of explanation consider that FIG. 7 refers to one named chain of a set of one or more chains.

Step 704 evaluates whether an old chain of the same name is still running, and if so, the old chain is cancelled (step 706), as generally described above. This may include bubbling the cancel to the other tasks of the old chain, including to any multiplexer(s), as also described above.

Step 708 selects the first task of the chain, and step 710 calls to queue this task. Note that if this task was previously shared and it completed successfully, and if any of its results are still available and valid with respect to the new chain, the prior result may be used instead of re-running the task.

Step 712 evaluates whether the task completes successfully. If not, step 714 cancels the rest of the chain. Otherwise, steps 716 and 718 move to the next task in the chain and so on to have each task run until none remain or something other than a success occurs, e.g., a cancel or a failure. Step 720 represents using the results in some desired way; e.g., one task fetched an image, another task fetched text, another task formatted a UI element with the text and image, another task rendered the UI element, and now the UI element may be interacted with by a user via other code in the object.

Figure 8:
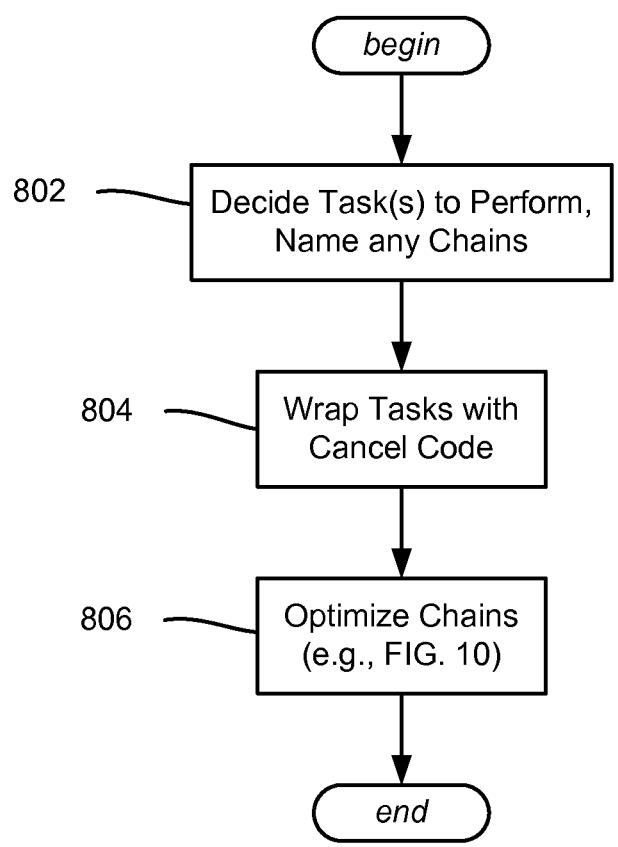
FIG. 8 is a flow diagram showing example steps that may be taken with respect to preparing tasks and task chains for running and for possible cancellation, according to one or more example implementations.

FIG. 8 summarizes some of the steps related to tasks and chains, beginning at step 802 where the object (or developer) decides which tasks are to be performed, and names any chains. Step 804 wraps the tasks with the cancel-handling code as described above with reference to FIGS. 5, 6A and 6B. Step 806 optimizes the chains, e.g., shares and multiplexes any shareable tasks, e.g., exemplified herein with reference to FIG. 10. Note that some or all of these steps may be done prior to runtime, e.g., an object may be pre-defined with its tasks and named chains, with each task wrapped with cancel-handling code, and any optimization performed before the object is instantiated. Alternatively, an object may do at least some of these acts at runtime, e.g., an object may have many different chains and decide which of many possible combinations of chains to run based upon some current set of one or more conditions, in which event a given combination may need to be dynamically chosen for a current condition set and optimized after choosing.

Figure 9A:
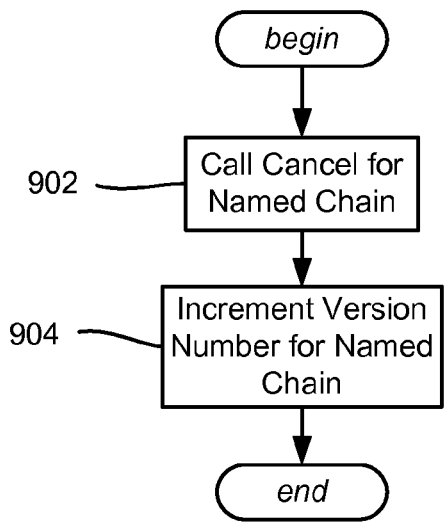
FIGS. 9A and 9B are flow diagrams showing example steps that may be taken with respect to using a version number with respect to cancelling task chains, according to one or more example implementations.
Figure 9B:
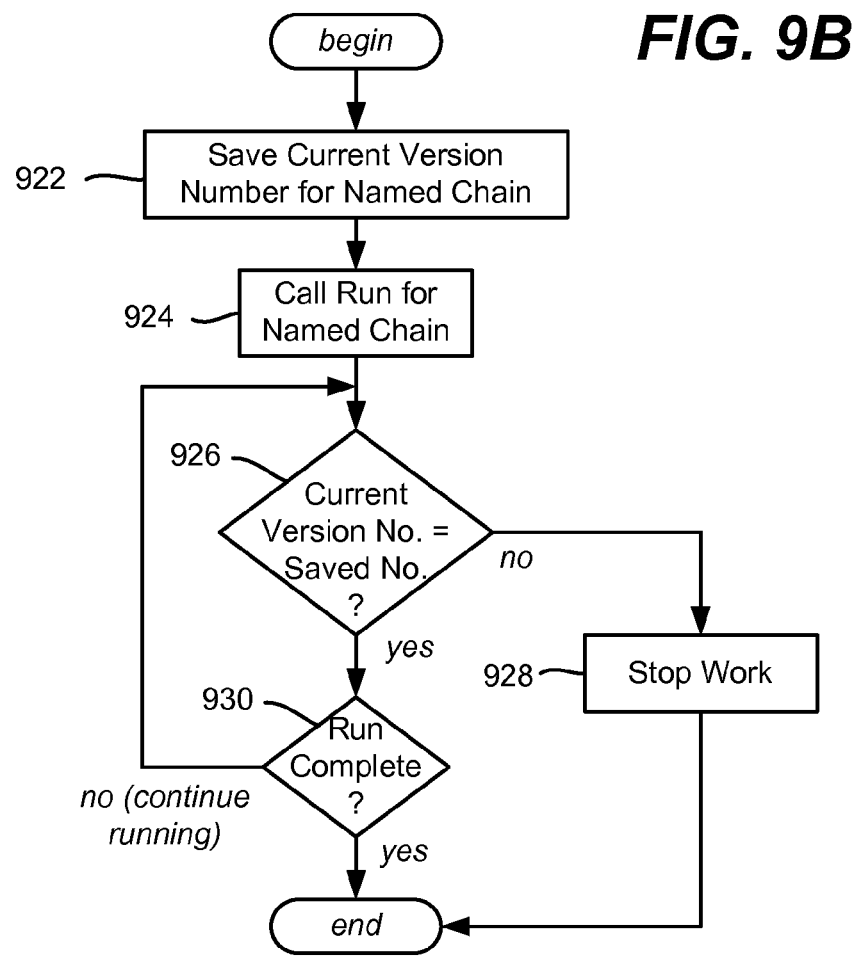

FIGS. 9A and 9B are directed towards another aspect of cancellation, e.g., if the specifics of the cancel check matter, cancelling may be done by associating a "version" number with each chain. As represented in FIG. 9A, each time cancel is called on the chain (step 902), the version number for that chain is incremented (step 904). As represented in FIG. 9B, each time run is called (step 924), the version number at that time is saved (step 922). While running the chain's tasks, at step 926 the current version is compared with the start version, and if they do not match, the work is stopped (the chain is cancelled) at step 928. Otherwise the chain continues to run its tasks until completed (step 930), or via FIG. 9A a cancel is called (step 902) that changes the version number (step 904) during the running of the chain's tasks.

Figure 10:
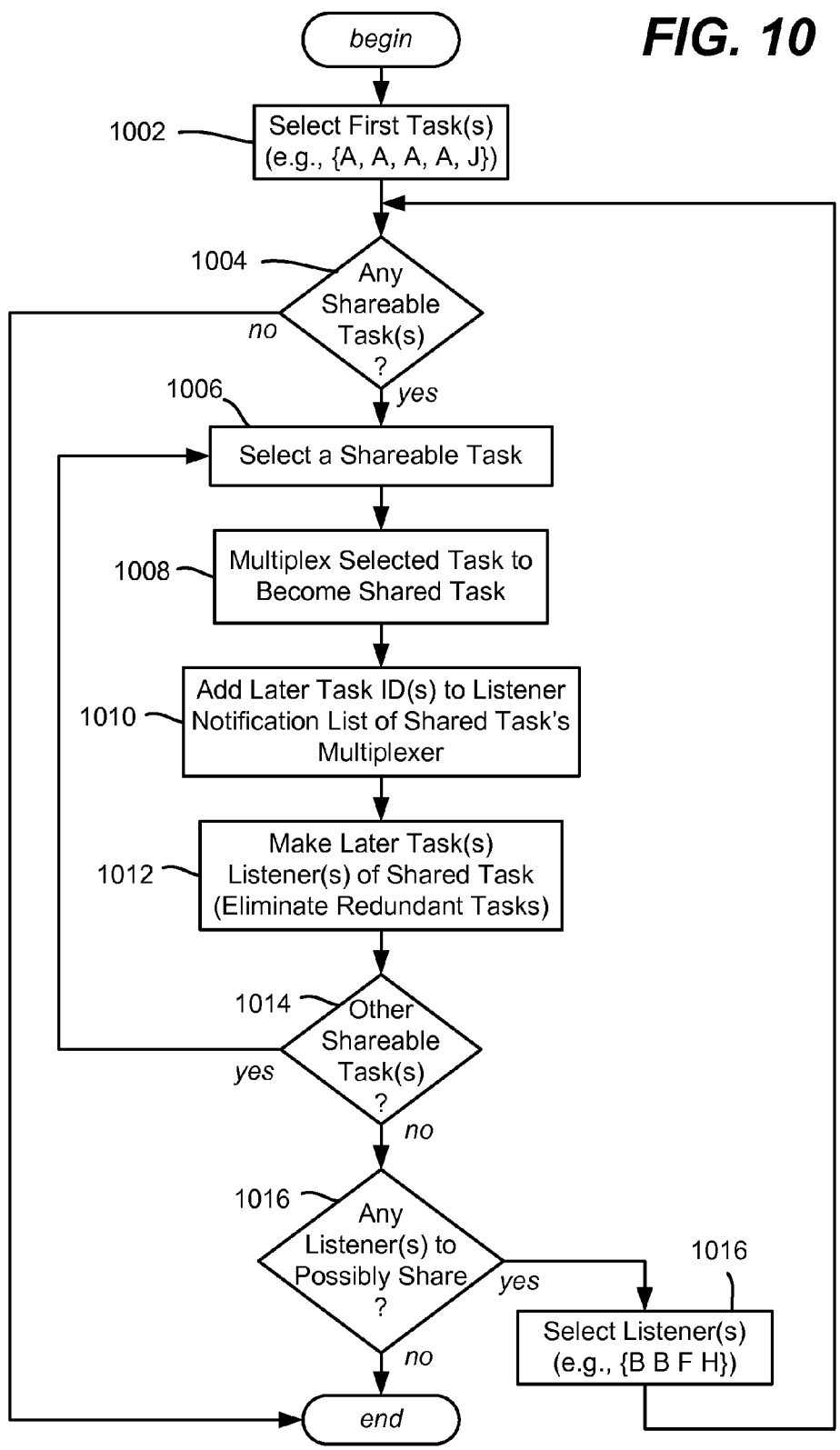
FIG. 10 is a flow diagram showing example steps that may be taken with respect to optimizing task chains for running, including sharing async tasks and multiplexing shared async tasks, according to one or more example implementations.
Figure 11:
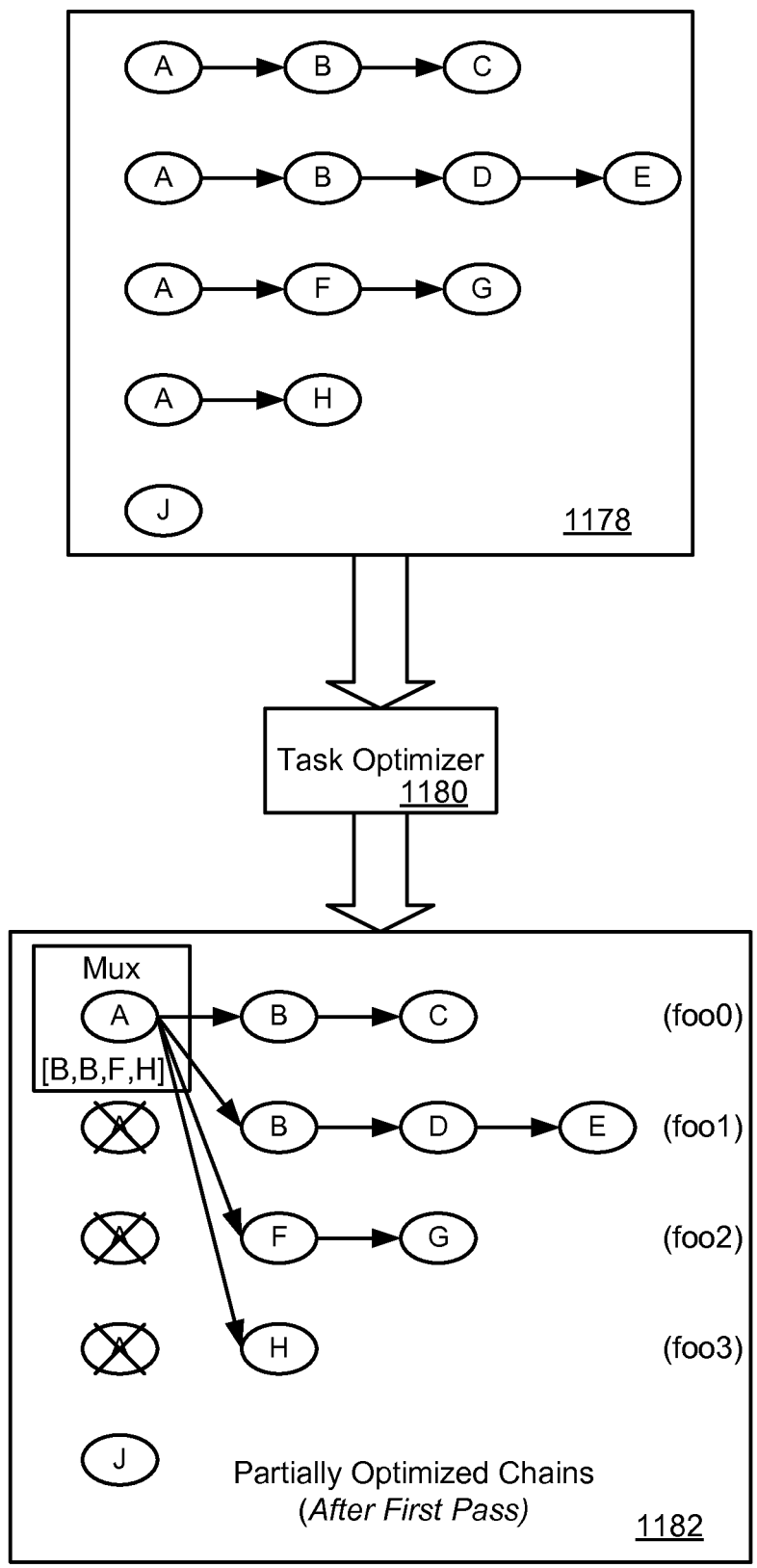
FIGS. 11 and 12 are example representations of how task chains may be processed for optimization, according to one or more example implementations.
Figure 12:
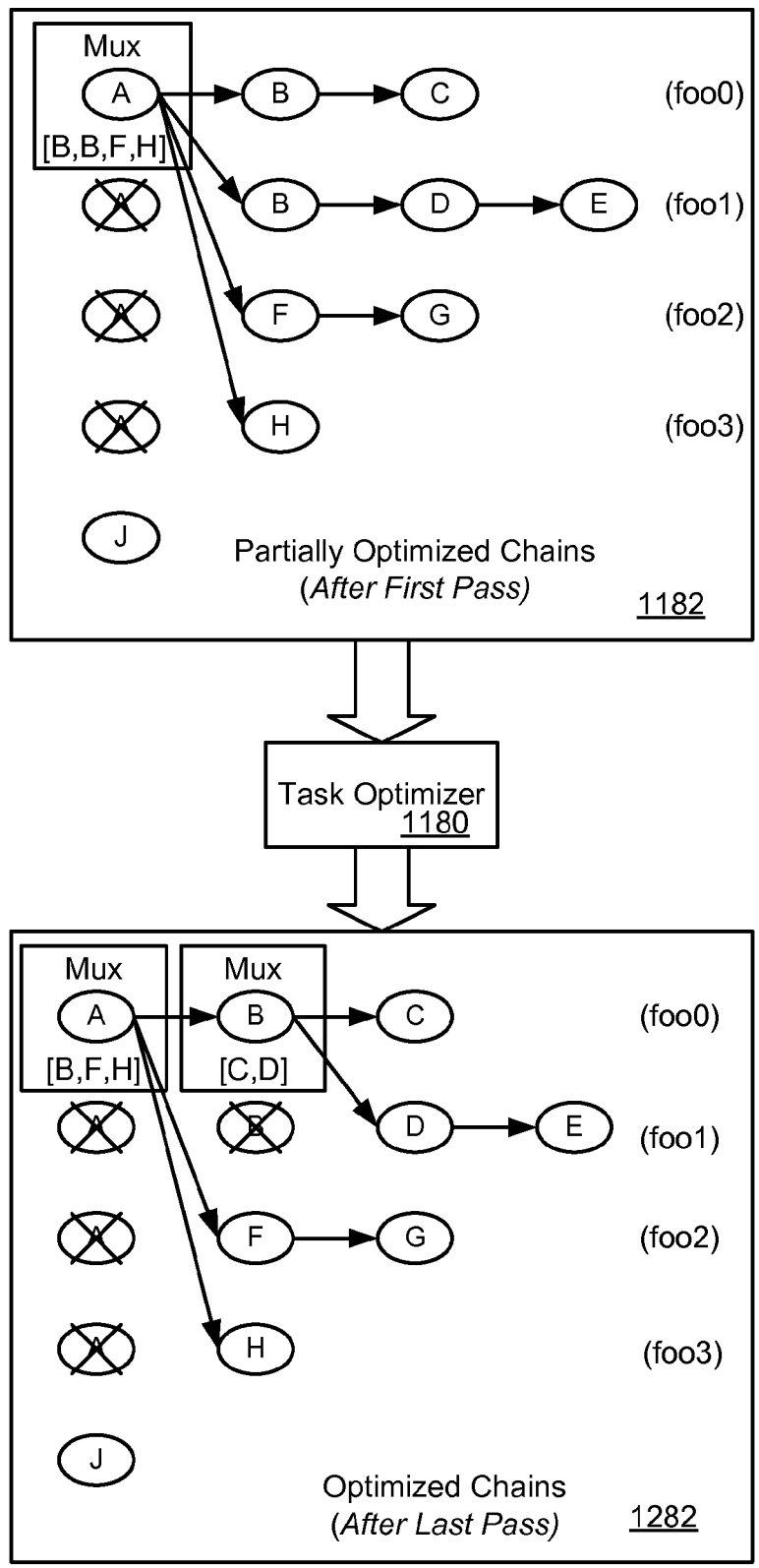

FIGS. 10-12 are directed towards one example optimization of chains, in which FIG. 10 comprises example optimization steps, and FIGS. 11 and 12 are representations of task chains being converted into a task tree having shared tasks. Note that there are many ways to perform optimization, and the one exemplified in FIG. 10 is only one such way. Further, note that FIG. 11 shows non-optimized chains 1178 transformed by an optimizer 1180 into partially optimized chains 1182, which are further transformed into fully optimized chains 1282 in FIG. 12. Also note that the single task J may be considered a chain even though it has no dependent entities.

Step 1002 selects the first (highest) set of tasks, e.g., moving from left to right in the chains, which as seen in FIGS. 11 and 12 is the set [A A A A J]. Step 1004 evaluates whether there are any shareable tasks in this set, which as can be seen, include task A in this example. Step 1006 selects such a shareable task, and step 1008 multiplexes this task for sharing, e.g., by wrapping the task in code (e.g., FIG. 4) that prevents one listener's cancellation from impacting any other independent listeners. In FIG. 11, this is represented by the "Mux" box around selected task A.

Step 1010 adds the next level of tasks, e.g., its identifiers (IDs) or the like, to the list of listeners to notify. In the example of FIGS. 11 and 12, this list (for now) is the set [B B F H]. Step 1012 makes the elements of this set listeners, e.g., by basically removing the non-selected common task(s) from their chains and linking the selected, shared task to the chains, as generally represented by the "X'd-out" non-selected A tasks, and by the arrows from the shared task A to the next level of tasks, the set [B B F H]. Note that if one of the A tasks was not part of any chain, step 1010 or 1012 may add the "NULL" listener or otherwise flag the multiplexer in some way so that task A runs even if all its other dependent listeners cancel.

Step 1014 repeats the process for other shareable top-level tasks. Note that there are none shown in the example of FIGS. 11 and 12, however consider that the set in another scenario was [A A A A J V V V W W] (instead of [A A A A J]). As is understood, such V and W tasks are also shareable in this alternative example, and thus would be processed in the same way, repeating via step 1014, first for the V tasks and then again for the W tasks.

Once there are no more shareable tasks at this level, the process continues to step 1016 where the next level is evaluated, corresponding to the set [B B F H]. As can be seen, the B tasks (listeners) can be shared, and thus these are selected via step 1016. The process thus repeats, and as represented in FIG. 12 via block 1282, the B tasks become multiplexed and shared. Note that task A's listener set is updated to reflect that there is only one B listener, which may be part of this optimization process, or separately performed.

It should be noted that there is not always a need to multiplex a shared task, although this is not expressly described in the logic of FIG. 10. For example, consider the three chains A→B→C and A→B→D and A→B→E. If there are no other chains to be optimized, task A need not be multiplexed because if listener task B cancels, shared task A has no listeners and thus also cancels. Shared task B needs to be multiplexed, so that the cancellation of task C, D or E does not affect the other non-cancelled tasks. Although there is no harm in having shared task A multiplexed with a single listener B, if desired, a separate process may look for such situations and remove the multiplexing wrapped code for the task A, or the example steps of FIG. 10 may be modified to recognize and deal with this situation.

As can be seen, the technology described herein allows the use of optimized chains (e.g., promise chains) and trees.

Via multiplexing and wrapped cancel-checking code, dependencies in async tasks work well and in a robust way.

One or more aspects are directed towards multiplexing an async task that is identified in at least two task chains, including sharing results of the async task between a set of listeners comprising at least two dependent lower-level listeners. The technology includes maintaining identity information of each dependent lower-level listener in association with the async task, and preventing the cancellation of one listener from cancelling the async task as long as at least one listener remains dependent on the async task, based upon the identity information.

Preventing the cancellation of one listener from cancelling the async task may comprise receiving a cancel request corresponding to a cancelled lower-level listener, accessing the identity information, and modifying the identity information including removing the cancelled lower-level listener from the set of listeners dependent on the async task. The identity information may be used to determine that at least one non-cancelled listener remains dependent on the async task.

Each listener of the listener set may be notified upon completion the async task. Further, each listener of the listener set may be queued to run as another async task.

The task chains may be optimized make an async task in each task chain a shared task. The async task code that performs the async task may be wrapped in cancel-checking code. Running the async task may include executing the cancel-checking code to determine whether the async task is intended to be cancelled, and if intended to be cancelled, not executing at least some of the async task code.

The listener may be a listener task including listener task code that performs the listener task. The listener task code may be wrapped in cancel-checking code that checks, before the listener task code executes, whether the listener task is intended to be cancelled, and if intended to be cancelled, to not allow at least some of the listener task code to execute.

A task chain may be associated with a name. A pending task chain may be cancelled based upon the name associated with the pending task chain. A pending task chain may be cancelled based upon the name associated with the pending task chain matching a name of a new task chain to be run instead of the pending task chain.

A task chain may be associated with a name and a current cancel version number that is based upon a cancel call for that task chain. The current cancel version number may be saved as a saved cancel version number in association with the name. While running a task chain with a matching name, the saved cancel version number is evaluated with a current cancel version number; the task chain is cancelled if the saved cancel version number does not match the current cancel version number.

One or more aspects are directed towards a requesting entity that includes a first task chain having a shared async task that is shared with a second task chain, including to provide results of successfully running the shared async task to a listener of the first task chain and to a listener of the second task chain. A multiplexer maintains an association of identity information of the listener of the first task chain with the async task and identity information of the listener of the second task chain with the async task. The multiplexer is configured to notify the listener of the first task chain and the listener of the second task chain when the async task completes. The multiplexer is further configured to prevent cancellation of the listener of the second task chain from cancelling the async task if the listener of the first task chain has not cancelled, and to prevent cancellation of the listener of the first task chain from cancelling the async task if the listener of the second task chain has not cancelled.

The requesting entity may be an object instance. An optimizer may process an async task of the first task chain and an async task of the second task chain into the shared async task.

A wrapping process may wrap the listener of the first task chain with cancel-checking code that stops at least some task work of the listener of the first task chain if the listener of the first task chain is intended to be cancelled. The wrapping process may wrap the listener of the second task chain with cancel-checking code that stops at least some task work of the listener of the second task chain if the listener of the second task chain is intended to be cancelled.

One or more aspects are directed towards maintaining an identity of a first listener and an identity of a second listener in a listener set of one or more listeners associated with a shared async task. Upon receiving a cancel request corresponding to cancellation of the second listener, based upon the cancel request, described herein is removing the identity of the second listener from the set of listeners associated with the shared async task. Also described herein is determining whether at least one listener remains in the listener set, and if so, running the shared async task, and notifying each listener in the set of listeners upon completion of the async task.

When the determination as to whether at least one listener remains in the listener set determines that no listeners remain, the async task may be cancelled.

The async task may be wrapped with cancel-checking code that stops at least some task work of the async task if the async task is intended to be cancelled. The first listener may be wrapped with cancel-checking code that stops at least some task work of the first listener if the first listener is intended to be cancelled.

Maintaining the identity of the first listener and the identity of a second listener in the listener set may include multiplexing the shared async task, including wrapping the shared async task with multiplexer code 1) for removing the identity of the second listener from the set of listeners associated with the shared async task, and 2) for determining whether at least one listener remains in the listener set.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 13 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 13:
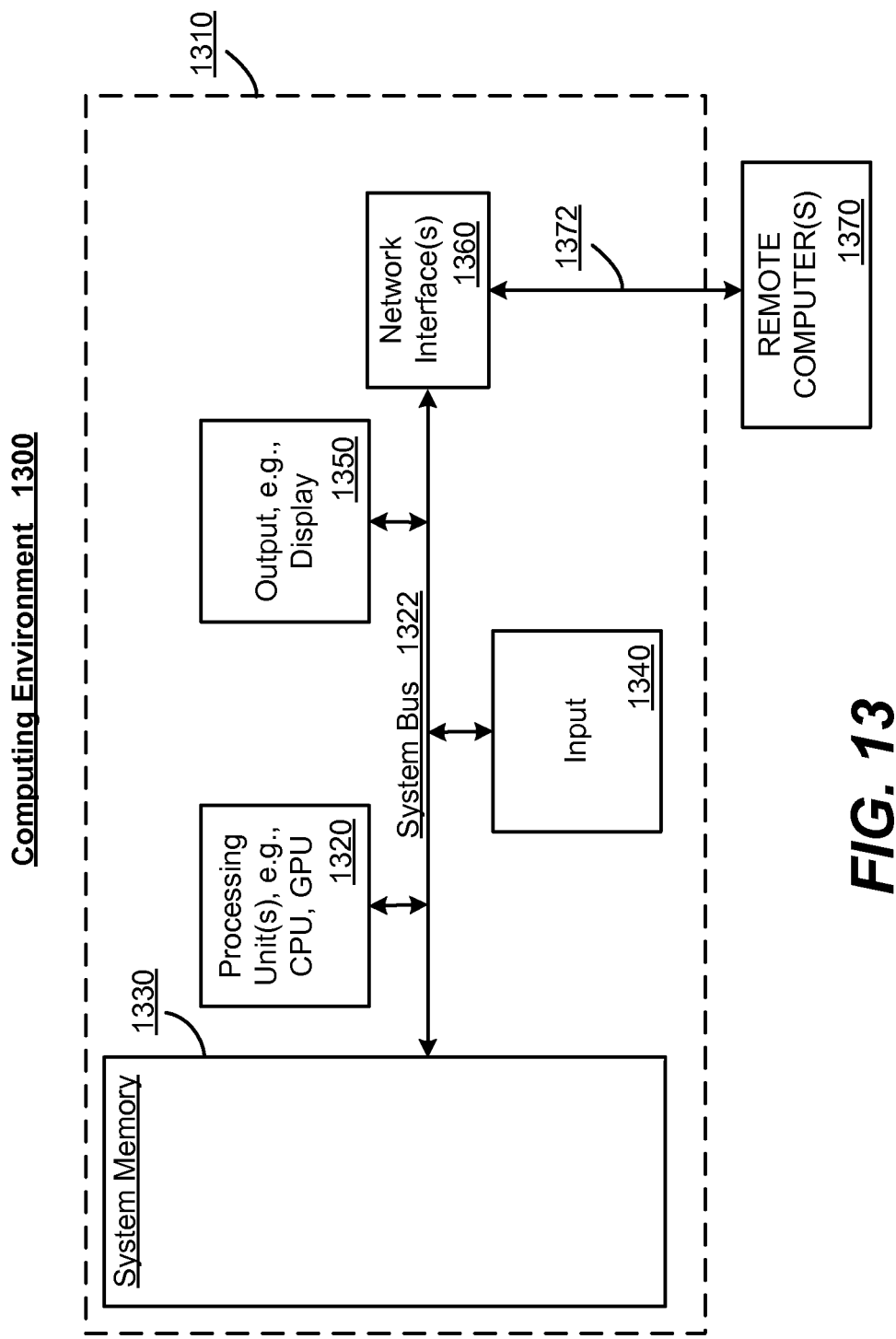
FIG. 13 is a block diagram representing an example computing environment into which aspects of the subject matter described herein may be incorporated.

FIG. 13 thus illustrates an example of a suitable computing system environment 1300 in which one or aspects of the implementations described herein can be implemented, although as made clear above, the computing system environment 1300 is only one example of a suitable computing environment and is not intended to suggest any limitation as to scope of use or functionality. In addition, the computing system environment 1300 is not intended to be interpreted as having any dependency relating to any one or combination of components illustrated in the example computing system environment 1300.

With reference to FIG. 13, an example device for implementing one or more implementations includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of machine (e.g., computer) readable media and can be any available media that can be accessed by a machine such as the computer 1310. The system memory 1330 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1330 may also include an operating system, application programs, other program modules, and program data.

A user can enter commands and information into the computer 1310 through one or more input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method performed at least in part on at least one machine, comprising:
   multiplexing an async task that is identified in at least two task chains, including sharing results of the async task between a listener set comprising at least two dependent lower-level listeners, maintaining identity information of each dependent lower-level listener in association with the async task, preventing the cancellation of one listener from cancelling the async task as long as at least one listener remains dependent on the async task, based upon the identity information, wherein the listener comprises a listener task including listener task code that performs the listener task, and wrapping the listener task code in cancel-checking code that checks, before the listener task code executes, whether the listener task is intended to be cancelled, and if intended to be cancelled, not allowing at least some of the listener task code to execute.

2. The method of claim 1 wherein preventing the cancellation of one listener from cancelling the async task comprises receiving a cancel request corresponding to a cancelled lower-level listener, accessing the identity information, modifying the identity information including removing the cancelled lower-level listener from the set of listeners dependent on the async task, and determining from the identity information that at least one non-cancelled listener remains dependent on the async task.

3. The method of claim 1 further comprising, notifying each listener of the listener set upon completion the async task.

4. The method of claim 3 further comprising, queuing each listener of the listener set to run as another async task.

5. The method of claim 1 further comprising, optimizing the at least two task chains to make the async task a shared task.

6. The method of claim 1 further comprising, associating a task chain with a name.

7. The method of claim 6 further comprising, cancelling a pending task chain based upon the name associated with the pending task chain.

8. The method of claim 6 further comprising, cancelling a pending task chain based upon the name associated with the pending task chain matching a name of a new task chain to be run instead of the pending task chain.

9. The method of claim 1 further comprising, associating a task chain with a name and a current cancel version number that is based upon a cancel call for that task chain, maintaining the current cancel version number as a saved cancel version number in association with the name, and while running a task chain with a matching name, evaluating the saved cancel version number with a current cancel version number and cancelling the task chain if the saved cancel version number does not match the current cancel version number.

10. A method performed at least in part on at least one machine, comprising:
    multiplexing an async task that is identified in at least two task chains, including sharing results of the async task between a listener set comprising at least two dependent lower-level listeners, maintaining identity information of each dependent lower-level listener in association with the async task, preventing the cancellation of one listener from cancelling the async task as long as at least one listener remains dependent on the async task, based upon the identity information, associating a task chain with a name and a current cancel version number that is based upon a cancel call for that task chain, maintaining the current cancel version number as a saved cancel version number in association with the name, and while running a task chain with a matching name, evaluating the saved cancel version number with a current cancel version number and cancelling the task chain if the saved cancel version number does not match the current cancel version number.

11. The method of claim 10 wherein preventing the cancellation of one listener from cancelling the async task comprises receiving a cancel request corresponding to a cancelled lower-level listener, accessing the identity information, modifying the identity information including removing the cancelled lower-level listener from the set of listeners dependent on the async task, and determining from the identity information that at least one non-cancelled listener remains dependent on the async task.

12. The method of claim 10 further comprising, notifying each listener of the listener set upon completion the async task.

13. The method of claim 12 further comprising, queuing each listener of the listener set to run as another async task.

14. The method of claim 10 further comprising, optimizing the at least two task chains to make the async task a shared task.

15. The method of claim 10 further comprising, wrapping async task code that performs the async task in cancel-checking code.

16. The method of claim 15 further comprising, running the async task, including executing the cancel-checking code to determine whether the async task is intended to be cancelled, and if intended to be cancelled, not executing at least some of the async task code.

17. The method of claim 10 wherein the listener comprises a listener task including listener task code that performs the listener task, and further comprising wrapping the listener task code in cancel-checking code that checks, before the listener task code executes, whether the listener task is intended to be cancelled, and if intended to be cancelled, not allowing at least some of the listener task code to execute.

18. The method of claim 10 further comprising, associating a task chain with a name.

19. The method of claim 18 further comprising, cancelling a pending task chain based upon the name associated with the pending task chain.

20. The method of claim 18 further comprising, cancelling a pending task chain based upon the name associated with the pending task chain matching a name of a new task chain to be run instead of the pending task chain.

\* \* \* \* \*